Patented June 28, 1932

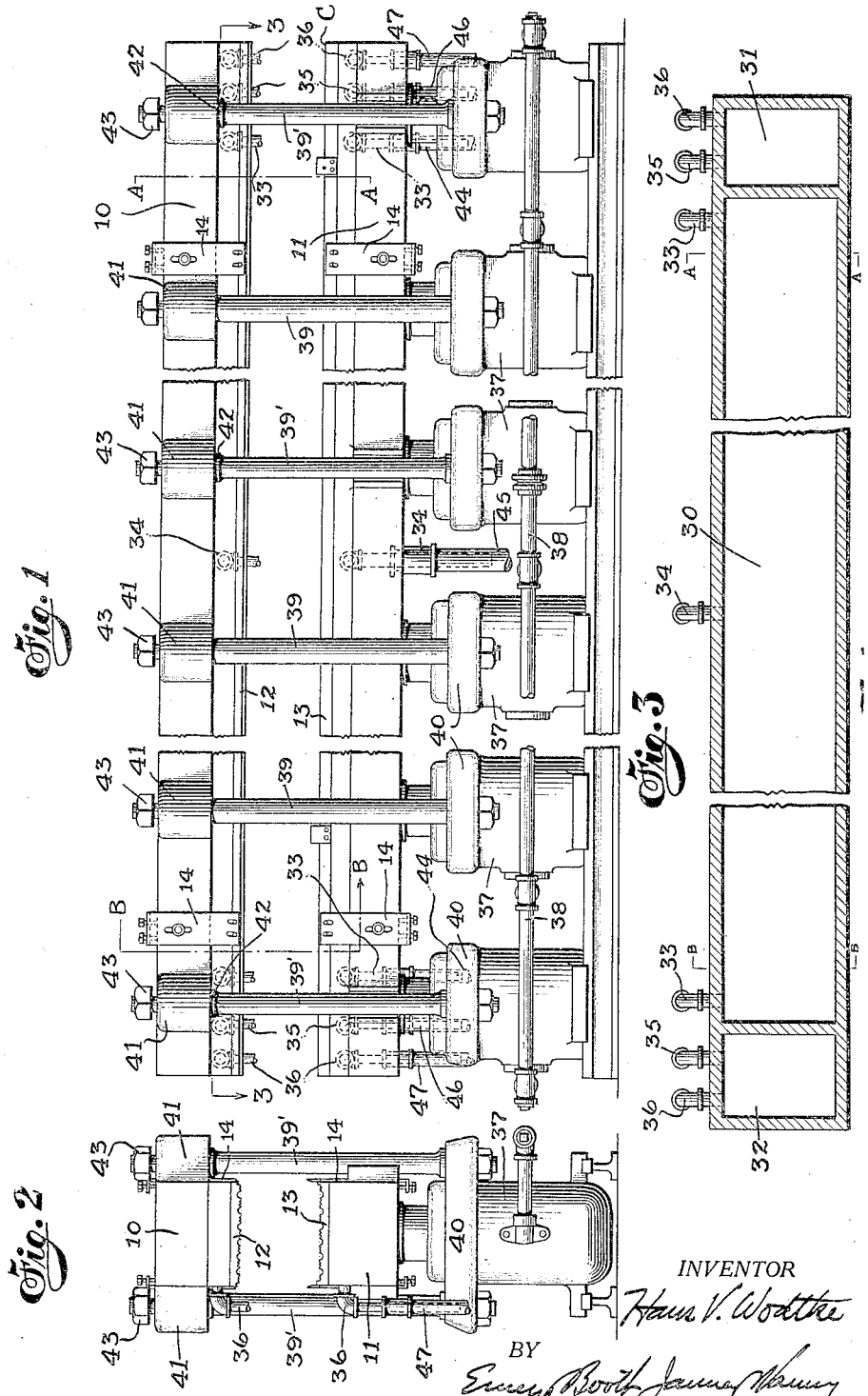

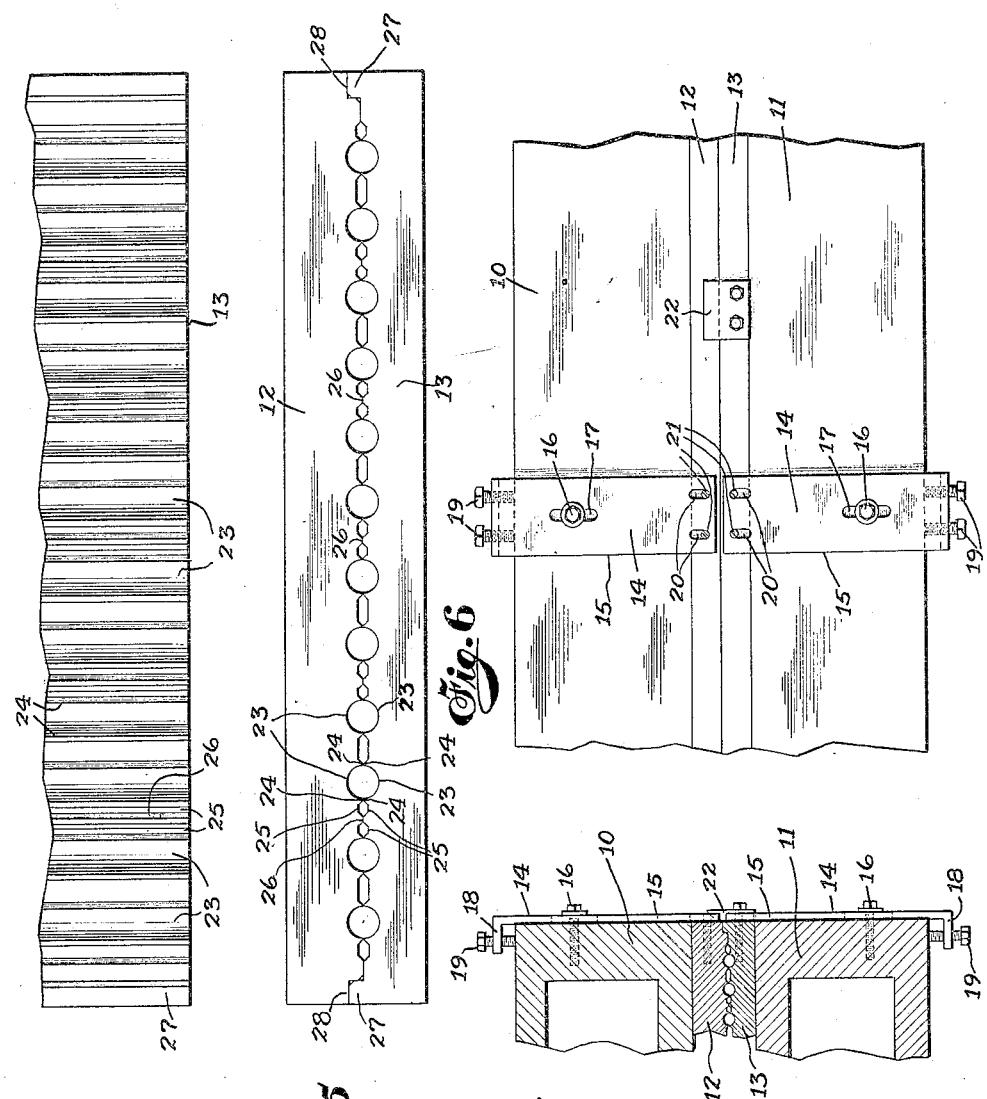

1,865,416

UNITED STATES PATENT OFFICE

HANS V. WODTKE, OF BUFFALO, NEW YORK, ASSIGNOR, BY MESNE ASSIGNMENTS, TO GENERAL CABLE CORPORATION, OF NEW YORK, N. Y., A CORPORATION OF NEW JERSEY

APPARATUS FOR AND METHOD OF VULCANIZING

Application filed April 2, 1923. Serial No. 629,406.

The present invention relates to improvements in the art of manufacturing elongated rubber articles such as electrical cables and the like, and to apparatus which may be used in such manufacture.

It is an object of this invention to provide a method of and mechanism for vulcanizing elongated rubber articles in such manner that the compound will be made into a homogeneous mass and the article will be made uniform in quality and condition throughout its length.

For the purpose of illustrating and describing this invention insofar as it pertains to mechanism, a preferred illustrative embodiment thereof has been selected and in connection therewith an illustrative embodiment of the invention pertaining to process or method will be described. In the drawings:

Figure 1 is a side elevation of a machine, parts being broken away;

Figure 2 is an end elevation thereof;

Figure 3 is a horizontal sectional view on line 3—3 of Figure 1 showing heating chambers;

Figure 4 is a plan view of one of the mold plates;

Figure 5 is an end elevation of two cooperating mold plates;

Figures 6 and 7 are respectively a side elevation and an end section of a detail of the machine which will be later referred to.

The embodiment of the invention illustrated in the drawings includes a pair of relatively movable platens 10 and 11, which carry cooperating mold plates 12 and 13 between which the plastic covering of the cable is vulcanized in a manner later to be described. The lower platen 11 is shown as movable toward and away from the upper platen 10. This latter platen is relatively stationary with respect to the lower platen, but is capable of a slight movement to permit the proper alignment of the mold plates as they are forced into contact with the cable being vulcanized.

The mold plates 12 and 13 are removably held on the platens by suitable clamps 14, so that they may be removed and replaced to accommodate the machine to cables of various sizes and forms.

A preferred form of clamp is shown in Figures 6 and 7 and consists of a side plate 15 adjustably fastened to the side of the steam chamber by a cap screw 16 passing through a slot 17 and an overhanging end plate 18 into which two adjusting screws 19 are threaded and adapted to bear against another wall of the steam chamber. Near the end of the plate 15 adjacent the mold plate, two slots 20 are formed and are adapted to receive studs 21 secured to the mold plate. This form of connection is preferred because of the possible unequal expansion of the metal of the mold plates and platens and also because cold mold plates may be inserted into a hot press. In order that the mold plates may be guided into exact registration with each other, guides 22 are rigidly secured to one of them, for example to the lower one as illustrated.

Each mold plate is provided with at least one groove 23 which extends longitudinally of the mold plate and preferably from end to end thereof, the number of grooves being determined by the number of cables which it is desired to treat simultaneously. The grooves in the mold plates cooperate with each other to form a complete mold for the cable being treated. The meeting edges 24 of these grooves 23 are preferably made as sharp as possible so as to cut off, as nearly as may be, the excess rubber as pressure is applied to the assembled cable.

The mold plates are also provided with depressions 25 arranged parallel with the grooves 23, which depressions are separated by partitions 26. These depressions accommodate the excess rubber which is squeezed from the grooves 23 by the pressure exerted during the vulcanizing operation so that it may subsequently be stripped from the covering and the flat topped partitions 26 act as bearing surfaces to limit the closing of the molds and prevent damage to the comparatively sharp cutting edges 24.

The lower mold plate has upstanding edges 27, the inner corners of which are beveled and the upper mold plate has its edge cut away as at 28 and beveled so that the plates will come together in proper alignment. As pressure is applied to the cooperating mold plates the rubber covering of the enclosed cable exudes between the edges 24 of the mold cavities into the depressions 25 because of the fact that the cable before being cured is of a size larger than the mold in which it is vulcanized and because of the further fact that the pressure on the mold plates is continuous as will later appear. The rubber which is squeezed from the cable remains attached thereto by a thin fin in spite of the sharpness of the edges 24 and extends upon diametrically opposed lines along each side of the cable. The bulk of this exuded rubber may be easily stripped from the finished cable but inevitably there remains a narrow thin ridge or fin which is one of the distinguishing features of cable made in accordance with the present process and apparatus.

In order that the mold plates may be heated to the proper temperature to vulcanize the rubber covering of the cable, each of the platens between which the mold plates are held is provided with a heating chamber 30 which extends throughout the greater portion of its length but which terminates short of the ends thereof. Between the ends of this heating chamber 30 and the ends of the platen, separate chambers 31 and 32 are provided.

In the illustrated embodiment of the machine the chambers 30 are shown as adapted to receive a heat exchange medium such as steam, which enters through inlets 33 and escapes through outlets 34, the inlets being located adjacent the ends of the chambers and the outlet intermediate the ends. The end chambers 31 and 32 are illustrated as adapted to receive any desired heat exchange medium and are provided with inlets 35 and outlets 36.

Satisfactory vulcanizing results are obtained by maintaining a temperature at the ends of the plates lower than the temperature in the middle sections thereof and preferably a circulation of cool water is maintained through the chambers 31 at the incoming end of the machine and air is maintained in the chambers 32 at the outgoing end of the machine. Whatever heat exchange medium is maintained in the chambers 31 and 32, these chambers serve to taper off or gradually reduce the temperature of the mold plates toward the ends. If water or another fluid be used in the chambers 31 at the incoming end of the machine, and air in the other chambers 32, the temperature of the mold plates between the water chambers 31 rises gradually from the extreme outer ends of the plates throughout the length of the chambers 31 and to a line over the steam chamber 30 which may be approximately indicated by the line A—A, due to the absorption of the heat from the steam by the water. At the other end of the machine the temperature is gradually reduced, from a line approximately indicated by the line B—B over the steam chamber to the outer ends of the mold plates, but the temperature over the chamber 32 is preferably higher than that between the water chambers 31 and obviously would be so if no water or warmer water is circulated through chambers 32.

In order that the mold plates 12 and 13 may be forced into contact with the cable so as to exert continuous pressure on the same, the lower platen is provided with an elevating mechanism which, in the form illustrated, includes a series of hydraulic rams 37 into each of which the fluid is forced under pressure from a common main 38.

The upper platen 10 is supported on standards 39 which extend upwardly from flanges 40 of the ram casings, and pass through bosses 41 on the upper platen. Certain of these standards merely act as guides, while others, which are designated by the reference numeral 39' are provided with collars 42 on which the upper platen rests. On the upper end of each standard 39 and 39' is a nut 43 between which and the upper face of the adjacent boss 41 is a space which permits a slight upward movement of the upper platen from the supporting collars 42. This movement, as hereinbefore stated, permits the two mold plates to accommodate themselves to each other when they are forced into contact with the work.

The steam chamber 30 on each of the platens is supplied with steam, as hereinbefore described, through the steam inlet openings from a suitable source through pipes 44, and the steam is conducted from the chambers through pipes 45. Each of these pipes 44 and 45 is provided with telescopic sections to permit the movements of the platens. The water is conducted to the chambers 31 and 32, if both chambers are to be supplied with water, through pipes 46 and from the chambers through pipes 47, each of which pipes is also provided with telescopic sections.

In carrying out the preferred form of the method, which is part of this invention, in connection with the embodiment of the machine illustrated, the cable, on the core of which the uncured rubber compound has been applied in any manner, is placed in a groove of the lower mold plate and extends from end to end thereof. The mold plates are forced together by the hydraulic rams and the pressure then increased to compress the covering compound during the vulcanization and to continuously exert the pressure. It has been found satisfactory to use an initial hydraulic pressure of about one hundred pounds per square inch to close the molds and when the molds have been brought together and into alignment to increase this pressure greatly and to maintain a very great pressure during the entire period of vulcanization. With an arrangement of mold plates and platens similar to that illustrated, a hydraulic pressure of approximately 1000 pounds per square inch, more or less, may be used with success and this results in a pressure of from 250 to 400 pounds per square inch upon the exterior surface of the cable depending of course upon the number and diameter of cables vulcanized at one time. It will be at once realized that such pressures are not attainable in any of the common methods of insulated wire vulcanization such as the open steam process wherein the steam comes into direct contact with the insulating covering.

The steam flowing through the chambers 30, the water through the chambers 31, and the presence of air in the chambers 32 raises the temperature of the mold plates to a vulcanizing heat graduated from end to end. Satisfactory results have been attained by introducing steam at about 306° F. into the chambers 30 and water at about 60° F. into the chambers 31.

If the electrical conductor being vulcanized is longer than the mold plates as is usually the case, the rubber covering is vulcanized in sections, that is to say, a portion of the cable of a length equal to that of the mold plates is placed between the plates and vulcanized under pressure. When the vulcanizing of this section is completed the platens are separated and an additional length of the cable is drawn between the mold plates. After the curing of the preceding section of the insulating compound, when the subsequent section is moved between the mold plates the point on the cable which is located at the outer end of the chamber 31 at the incoming end of the machine where the temperature is the lowest, which point is marked C, (Figure 1), is drawn through between the mold plates approximately to the line B—B at the outgoing end of the machine, where the temperature over the steam chamber 30 just begins to be reduced. Thus the portion of the compound which is subjected to the greatest heat adjacent the incoming end of the machine is subjected to the least heat at the outgoing end, and that which is subjected to the least heat at the incoming end of the machine is subjected to the greatest heat at the outgoing end. This step-by-step vulcanizing action is repeated until the covering of the entire cable has been vulcanized.

This graduation or tapering off of the temperature of the mold plates results in the production of a vulcanized covering which is substantially uniform in character, without any definite lines of demarcation between the successively vulcanized sections. The finished cable is of uniform diameter and has a smooth compacted surface. The density, tensile strength and toughness of the compound are very substantially improved over the similar qualities of the same compound vulcanized by the so-called open cure or by any other previously known method or apparatus.

Furthermore, the vulcanization of the covering under pressure causes the unification of the cable, that is to say, causes the adhesion of the covering to the core, and the permanent positioning of the core within the covering, whether the core be a single or multiple electrical conductor or of some other form or material.

While there has been described a particular embodiment of a machine and also the method as used in producing a rubber compound insulated electrical cable, it is to be understood that the invention is not limited to the particular embodiment of machine or method.

I claim as my invention:

1. The method of treating an article which includes vulcanizing sections of the article progressively between molds of lesser length than that of the article, and maintaining a gradually decreased temperature toward the ends of the molds, the temperature at one end of the molds being decreased to a greater extent than that at the other end.

2. The method of treating an article which includes vulcanizing sections of the article progressively between molds of lesser length than that of the article, and maintaining a gradually decreased temperature toward the ends of the molds, the temperature at one end of the molds being decreased to a greater extent and more rapidly than that at the other end.

3. A mold for vulcanizing articles of plastic compound comprising, in combination, cooperating mold plates each having a plurality of grooves bounded by sharp upstanding edges, the grooves of one plate cooperating with those of the other to form mold cavities for the reception of said articles, and intermediate grooves bounded upon one side by said sharp edges and upon the other side by flat topped partitions acting as meeting surfaces to limit the movement of the mold plates toward each other.

4. A mold for vulcanizing elongated objects comprising in combination, cooperating mold plates having grooves for the object, a central heating chamber, means providing ingress and egress of heating fluid to said central chamber, end heating chambers each separated from said central chamber by a single wall, and means providing separate ingress and egress of heat exchange fluid to said end heating chambers whereby a controlled heat gradient may be obtained from the central chamber to the ends of the mold.

5. A mold for vulcanizing elongated objects comprising in combination, cooperating mold plates having grooves for the object, a central heating chamber, means providing ingress and egress of heating fluid to said central chamber, end heating chambers each separated from said central chamber, and means providing separate circulating systems for supplying a different heat exchange fluid to each of said end heating chambers whereby a controlled heat gradient may be obtained from the central chamber to the ends of the mold.

6. The method of vulcanizing elongated objects which comprises vulcanizing sections of the object progressively between molds shorter than the object, maintaining a controlled vulcanizing temperature throughout the greater part of the length of said molds and differently gradually decreased separately controlled vulcanizing temperatures toward the two opposite ends of the molds.

7. A mold for vulcanizing elongated objects comprising in combination, cooperating mold plates having grooves for the object, a central heating chamber, means providing ingress and egress of heating fluid for the said central chamber, end heating chambers at each end of the central chamber and each separated from said central chamber and means providing separate circulating systems for supplying a separate heat exchange fluid to each of said end heating chambers whereby a controlled heat gradient may be obtained from the central chamber to both the ends of the mold.

In testimony whereof, I have signed my name to this specification this 28th day of March, 1923.

HANS V. WODTKE.